（12）United States Patent
Swanson

(10) Patent No.: US 8,506,920 B2
(45) Date of Patent: Aug. 13, 2013

(54) METHOD FOR CREATING DIAMOND DUST VIA DETONATION OF CARBON DIOXIDE AND REDUCING AGENT COMBINATIONS

(76) Inventor: Daren Normand Swanson, Burlington (CA)

( * ) Notice: Subject to any disclaimer, the term of this patent is extended or adjusted under 35 U.S.C. 154(b) by 189 days.

(21) Appl. No.: 12/809,917

(22) PCT Filed: Dec. 22, 2008

(86) PCT No.: PCT/CA2008/002198
§ 371 (c)(1),
(2), (4) Date: Jun. 21, 2010

(87) PCT Pub. No.: WO2009/079758
PCT Pub. Date: Jul. 2, 2009

(65) Prior Publication Data
US 2010/0278712 A1    Nov. 4, 2010

Related U.S. Application Data

(60) Provisional application No. 61/008,632, filed on Dec. 21, 2007.

(51) Int. Cl.
*B01J 3/06* (2006.01)
*D03D 23/00* (2006.01)
*E21B 43/295* (2006.01)

(52) U.S. Cl.
USPC ............. 423/446; 149/108.2; 299/3; 977/773

(58) Field of Classification Search
None
See application file for complete search history.

(56) References Cited

U.S. PATENT DOCUMENTS

| 3,608,014 | A |   | 9/1971 | Balchan et al. |   |
|---|---|---|---|---|---|
| 4,483,836 | A | * | 11/1984 | Adadurov et al. | 423/290 |
| 5,861,349 | A | * | 1/1999 | Vereschagin et al. | 501/86 |
| 2008/0317659 | A1 | * | 12/2008 | Dolmatov | 423/446 |
| 2009/0004092 | A1 | * | 1/2009 | Dolmatov | 423/446 |
| 2010/0254884 | A1 | * | 10/2010 | Shenderova | 423/446 |

FOREIGN PATENT DOCUMENTS

| IN | 2004DE00475 | A |   | 5/2006 |
|---|---|---|---|---|
| RU | 2036835 | C1 | * | 6/1995 |
| RU | 2041166 | C1 |   | 8/1995 |
| RU | 2077377 | C1 | * | 4/1997 |
| RU | 2102542 | C1 | * | 1/1998 |

OTHER PUBLICATIONS

Lou et al.; Diamond Formation by Reduction of Carbon Dioxide at Low Temperatures; J. Am. Chem. Soc.; 125, 9302-9303; 2003.*
Shafirovich, et al. "Magnesium and Carbon Dioxide: A Rocket Propellant for Mars Missions." Journal of Propulsion and Power. vol. 9. No. 2. Mar.-Apr. 1993. pp. 197-203.
Luman, et al. "Development and Characterization of High Performance Solid Propellants Containing Nano-Sized Energetic Ingredients." Proceedings of the Combustion Institute. vol. 31 (2007). pp. 2089-2096.
Chen et al. "Recent Development in Diamond Synthesis." International Journal of Modern Physics B. vol. 22, No. 4 (2008). pp. 309-326.

* cited by examiner

*Primary Examiner* — Guinever Gregorio
(74) *Attorney, Agent, or Firm* — Jansson Munger McKinley & Shape Ltd.

(57) ABSTRACT

The present invention provides a method and formulation for the creation of a diamond-carbon bearing material of varying particle sizes. The material is a detonation by-product of explosive formulations that employ carbon dioxide as the oxidizing agent and a material, such as powdered magnesium, as the fuel for such detonation.

10 Claims, 5 Drawing Sheets

High Pressure Mixer

Figure 1. Side view of detonation well with byproduct removal from bottom.

Figure 2: High Pressure Mixer

Pressure-Temperature phase diagram for $CO_2$.

Figure 4: Stability and Detonation Testing

METHOD FOR CREATING DIAMOND DUST VIA DETONATION OF CARBON DIOXIDE AND REDUCING AGENT COMBINATIONS

FIELD OF THE INVENTION

The present invention relates to a novel method of creating diamond material from a detonation process involving an oxidizing agent preferably carbon dioxide, and a material that decomposes the oxidizing agent exothermically (a reducing agent), and methods that increase the mixture's shock sensitivity. In particular, this invention relates to a method of creating diamond material that employs an explosive formulation with a positive oxygen balance.

BACKGROUND

According to the U.S. Geological Survey, Mineral Commodity Summaries, January 2008, the US consumption of industrial diamonds in 2007 was estimated to be over 600 million carats, valued at over $300 million. It indicates that synthetic diamond rather than natural diamond is used for about 90% of industrial applications and the main application is in the abrasives industry. Diamond material is fused to metal to produce specialty cutting tools.

When a high enough pressure packs carbon atoms together, diamond is formed. The traditional approach to creating industrial diamonds with explosives is based on using the pressure of a detonation to pack carbon atoms together. With this approach carbon is physically added to an explosive or a system containing explosives, the explosive is detonated, and the pressure of the blast converts the added carbon into diamond dust.

An explosive is a detonatable mixture of a fuel, typically consisting of carbon and hydrogen, and an oxygen source. Waste products of a detonation are mainly carbon dioxide, water, and various nitrogen gases.

The term "oxygen balance" describes the ratio of oxygen to fuel in an explosive required to convert the ingredients to $CO_2$, $H_2O$, $Al_2O_3$ and other oxides. Insufficient oxygen in a formulation means there is not enough oxygen for all of the fuel, or it is said to have a negative oxygen balance. Since the traditional approach to creating diamonds with explosives uses extra carbon, or insufficient oxygen, the mix is considered negatively oxygen balanced.

Prior attempts have failed to solve the problem of reducing waste products and creating industrial diamond products from a positive oxygen balanced explosives approach. For example, the creation of industrial diamonds using explosives have been based on negative oxygen balances achieved by adding carbon to an explosive and detonating the formulation have been disclosed in the prior art.

U.S. Pat. No. 5,353,708 (Stavrev et al.) teaches a method of production of an ultra-dispersed diamond which can be used for the production of abrasive materials. While the invention taught by Stavrev allows for the production of a diamond, it does not solve the problem of creating a positive oxygen balance because the organic explosive or explosives have a stoichiometrically negative oxygen balance.

U.S. Pat. No. 5,916,955 (Vereschagin et al.) teaches a method of producing a diamond-carbon material that contains carbon, nitrogen, oxygen and incombustible impurities of a composition and the surface contains methyl, carboxyl, lactone, aldehyde, ether, and quinone groups by detonating an oxygen-deficient explosive. While the invention taught by Vereschagin allows for the creation of a diamond-carbon material, it does not solve the problem of creating a positive oxygen balance because the explosive has a negative oxygen balance.

U.S. Pat. No. 5,482,695 (Guschin et al.) teaches a method of producing super hard materials. While the invention taught by Guschin allows for the production of materials containing diamond products, it does not solve the problem of using a positive oxygen balance because the explosion has a negative oxygen balance.

Furthermore, there are numerous synthetic diamond manufacturers around the world and their products include diamond pastes, suspensions and lubricants and more with many applications. What is desired is an affordable method of creating industrial diamonds which consumes the greenhouse gas carbon dioxide and can also be used to reduce the consumption of products such as gasoline, oil and lubricants, which would reduce production costs and further benefit the environment.

SUMMARY OF THE INVENTION

An object of the present invention is to provide a method for creating diamond material from an explosive formulation with a positive oxygen balance preferably using carbon dioxide as the oxygen source and a reducing agent such as powdered magnesium metal as a material that decomposes the oxidizing agent exothermically on detonation.

Another object of the present invention is to provide a method for creating diamond that reduces waste.

Another object of the present invention is to provide a method to process carbon dioxide to create carbon products that have environmental benefits.

In accordance with the present invention, the present invention provides a method of producing a diamond-bearing material of varying sizes from the detonation of an explosive formulation with a positive to neutral oxygen balance, comprising the following steps:
(a) preparing a charge by blending an oxidizing agent and a material that decomposes said oxidizing agent exothermically on detonation;
(b) detonating the charge in an environment containing a medium that is inert to carbon and cools the detonation by-products.
(c) separating the detonation by-products containing carbon according to particle size and phase.

In another aspect the present invention relates to a detonatable formulation for a diamond-bearing material comprising an oxidizing agent, and a material that decomposes said oxidizing agent.

In a preferred embodiment the oxidizing agent is carbon dioxide and the material that decomposes said oxidizing agent exothermically on detonation is a reducing agent selected from the group consisting powdered or atomized metals, such as aluminium or magnesium.

The philosophy of oxygen balance is based on the understanding that a zero oxygen balanced explosive offers optimum energy because of the perfect balance of fuel to oxygen. In the case of the present invention, optimum energy output is achieved with roughly a 50:50 weight ratio of carbon dioxide to reducing agent. Although a traditional oxygen balance calculation for this invention's formulation would suggest a heavily negative one, the most energetic or stoichiometrically perfect mix of carbon dioxide to reducing agent should also have an oxygen balance of zero.

Due to the present invention's approach of basing an explosive formulation on a mixture of carbon dioxide and a reducing agent, and also considering the discrepancy of maximum energy output in relation to a traditionally zero oxygen balance, the carbon in the carbon dioxide, therefore, must not be included in the calculation of oxygen balance for explosive formulations that use any ratio of carbon dioxide to reducing agent as a basis for liberating energy. Due to this invention's use of carbon dioxide as a non-traditional oxidizer, the oxygen balance would have to be calculated in the traditional manner with the exception that the carbon in the carbon dioxide is not included in that calculation.

Because the carbon dioxide used in the present invention's formulations in a preferred embodiment is in its solid state at atmospheric pressure, which also happens to exist at a temperature of −78.5° C. as dry ice, the field of study of said formulations has been named "Cold Detonation Physics", or CDP.

BRIEF DESCRIPTION OF DRAWINGS

In drawings which illustrate by way of example only one embodiment of the invention.

Similar reference numbers are used in different figures to denote similar components.

DETAILED DESCRIPTION

Figure 1:
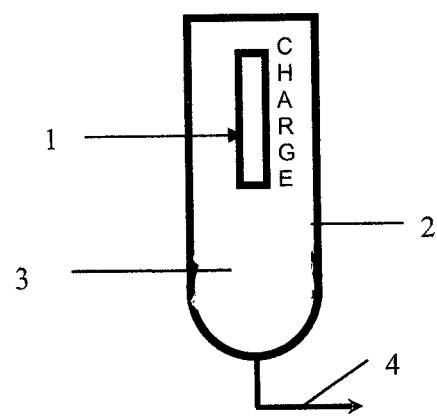
FIG. 1 shows a side view of a cylindrical detonation well, filled with water, with a charge hanging in accordance with one embodiment of a method of the present invention.

The present invention provides generally an explosives formulation and method for detonating it which yields 10-15% carbon by weight. The charges are prepared, detonated underwater, and by-products are collected. The resulting diamond material, which is comprised predominantly of carbon in the diamond crystal phase and a small percentage in the amorphous phase, is a detonation by-product of explosive formulations that use carbon dioxide as the oxidizing agent and a fuel or reducing agent that decomposes the carbon dioxide exothermically. Carbon dioxide is conventionally viewed as the by-product of a detonation and not an oxygen source.

In the detonation reaction, the reducing agent pulls the oxygen atoms from the carbon dioxide, leaving the carbon behind. The force of detonation compresses this carbon by-product into fine diamond of varying sizes as a function of the formulation composition, its density, diameter of charge, velocity of detonation, size of primer used for detonation, method of detonation including any electrical or alternative thermal means or techniques that transfer enough energy to initiate a detonation, the cooling rate of the by-products, the type of or level of chemical sensitizer added, oxygen balance, type of confinement, temperature of detonation, and external temperature and pressure at time of detonation.

Powdered or atomized metals, such as magnesium and aluminium, are suitable for use as fuel in formulations of this invention. Due to the nature of this invention's formulation being based on the energetic reduction of carbon dioxide, the terms "fuel" and "reducing agent" are interchangeable. Some embodiments of the present invention may use other reducing agents or combinations of reducing agents, require the use of a bulking agent, such as perlite, to control density, as well as a chemical sensitizer, such as RDX, to affect the formulation's rate of reaction, explosive performance and sensitivity to shock.

An oxygen balanced explosive means the formulation has exactly enough oxygen available to completely consume all of the fuel. In the present approach to make diamond material from a detonation, excess carbon is added to an explosive or a system containing one, thereby creating a system that is deficient in oxygen or has negative oxygen balance.

The present invention relates to explosive formulations that employ carbon dioxide as the oxygen source, the process of preparing and detonating the charges of the present invention, and the generation of diamonds through that process. The formulations of the present invention are prepared with at least the exact amount of carbon dioxide needed to match the oxygen demand of the fuel or reducing agent, which means that the formulations of the present invention work with a positive to neutral oxygen balance.

By detonating the explosive formulation of the present invention in an environment that protects the carbon by-products from subsequent chemical decomposition, such as a detonation chamber filled with oxygen-free water, a wide range of diamond-bearing material emerges with a high degree of homogeneity. Small angle scattering and analytical techniques can be used to determine the distribution of carbon phases and particle size distributions. In the preferred embodiment charges are detonated underwater and post-detonation debris collected. Water acts as a medium to transmit shock waves and cool detonation by-products rapidly.

Irrespective of whether the detonation by-products of the present invention are cooled quickly or slowly (at rates of 7000 degrees per minute versus 200 degrees per minute respectively), diamond will result from the detonation process.

The formulations of the present invention have a positive to neutral oxygen balance and can include any chemical, compound or element that decomposes carbon dioxide exothermically. The formulations of the present invention are detonated in an environment filled with a medium that is inert relative to the carbon by-products, such as argon gas or oxygen-free water. Employing water as the inert medium is advantageous as it functions both as a shock absorber and a cooling agent which cools the by-products at a rate that optimizes their physical characteristics. The formulations of the present invention, or systems that detonate or respond to the detonation of said formulations, may also contain diamond powder, nickel or any other material that improves the resulting diamond bearing material's ability to be bonded to other materials such as steel to make cutting tools.

The diamond bearing material produced has a density range of about 2.0 to 3.0 g/cm$^3$. The surface chemistry of the diamond bearing material produced will display varying degrees of hygroscopic behaviour in relation to the amount of organic alkyl functional groups that form on particle surfaces during and after detonation. A predominant methyl functional group, for example, gives the material a water-repellent property.

The surface of diamond bearing materials will display varying weight percentages of amorphous carbon. The diamond-bearing material will have a wide particle size distribution larger than and not limited to nano particles in the 40 to 50 Angstrom range. The diamond bearing material will be comprised to some extent of integrated diamond and non-diamond particles and polycrystalline diamond.

Figure 2:
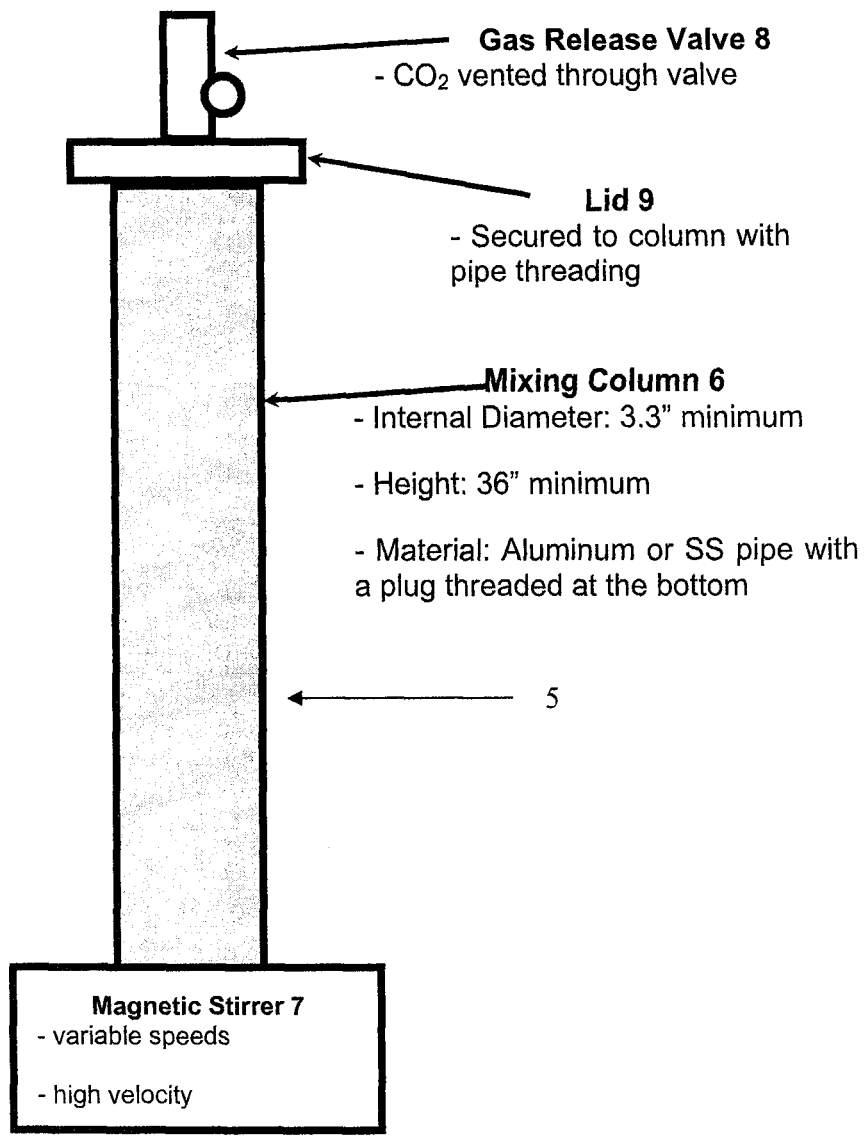
FIG. 2 is a side view of a high pressure mixer employed to mix liquid carbon dioxide with powdered reducing agent in accordance with one embodiment of the present invention.

One embodiment of the method for producing the diamond bearing material according the present invention consists of the following steps:

a. Prepare a charge by blending carbon dioxide, fuel, and potentially a sensitizer and fill a cylindrically shaped container such as a metal pipe or cardboard tube with that mixture. Mixing can be facilitated as follows:
  i) at atmospheric pressure by physically blending crushed carbon dioxide (dry ice) with other ingredients, or,
  ii) at atmospheric pressure by mixing freshly acquired liquid carbon dioxide with other ingredients (when pumped from a high-pressure container, carbon dioxide exists as a liquid for a short duration before turning into solid dry ice), or,
  iii) under high pressure where ingredients are added to carbon dioxide in its liquid state. A slurry of high pressure liquid carbon dioxide and other ingredients are depressurized to atmospheric pressure in a high pressure mixer (see FIG. 2), which causes the formulation to harden with all ingredients evenly dispersed. Controlling the rate of depressurization can be used to manipulate final charge density.

b. The charge is detonated in an environment containing a medium that is inert to carbon and cools the detonation by-products.

c. Detonation by-products containing carbon are separated according to particle size and phase (diamond versus amorphous and combinations thereof).

Steps and Rationale In the Charge Assembly of the Present Invention (CDP Charges)

1. Formulation

The CDP magnesium and aluminium formulations of the present invention suit the energy criteria for an explosive mixture, which can be chemically sensitized to improve rate of reaction if needed.

a) Based on Magnesium:

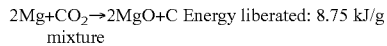

$$2Mg+CO_2 \rightarrow 2MgO+C \text{ Energy liberated: } 8.75 \text{ kJ/g mixture}$$

52.5% Mg+47.5% $CO_2$ by weight=Zero Oxygen Balance b) Based on Aluminium:

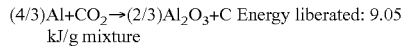

$$(4/3)Al+CO_2 \rightarrow (2/3)Al_2O_3+C \text{ Energy liberated: } 9.05 \text{ kJ/g mixture}$$

45% Al+55% $CO_2$ by weight

Comparisons:
  Energy liberated for TNT: 4.10 kJ/g;
  Energy liberated for Nitroglycerine: 6.38 kJ/g CDP formulations according to the present invention offer more energy per gram of formulation than traditional explosives such as nitro-glycerine and TNT. The ability to detonate CDP formulations, therefore, hinges upon whether the rate of energy released is fast enough to sustain a detonation shock wave. Reaction rate is heavily influenced by charge diameter, amount of initiation (size of primer or booster), charge confinement, density, temperature and chemical sensitivity. The addition of a sensitizer, such as an explosive like RDX, increases the rate of reaction. The addition of bulking agents, such as perlite or glass balloons, may be used to control density. CDP formulations may also include ingredients that affect the viscosity of liquid carbon dioxide or affect its ability to fully dissolve or emulsify other ingredients.

2. Charge Dimensions & Confinement

Exploring the explosive performance of CDP formulations will begin with filling 4"×2.5feet extra heavy gauge pipe (EH). In a heavily confined cylinder, such as an extra heavy gauge metal pipe, a 2"-4" inner diameter charge of mining explosive would detonate successfully with proper initiation.

A good rule of thumb in determining length of charge required for a proper detonation is 8 diameters (Dr. Katsabanis—"Explosives Technology"). So, for an inner diameter of 3", the charge length should at least be 8×3"=24" or 2 feet. Using 4" EH pipe, which has an inner diameter of 3.3", charge lengths will be at least 2.5 feet. The heavy confinement offered by extra heavy gauge pipe lowers the critical diameter required to sustain a detonation when compared with alternative packaging such as lighter gauges of pipe or cardboard tubing.

3. Detonation

A pipe filled with formulations of the present invention will be referred to as a CDP charge. One embodiment of a means to detonate a CDP charge is to equip the charge with an appropriately sized booster and a detonator. The objective with a CDP charge is to impart upon it a strong enough shock wave to initiate detonation, and maximum impact is delivered by a large enough booster whose diameter closely matches that of the charge.

Detonation of a CDP charge may also be initiated by other means such as electric discharge through any part of the charge, thermal ignition, firing a projectile at it, subjecting it to high pressure from a hydraulic press for example, or the use of additional explosive added either to the formulation or used in conjunction with the detonation procedure, as in lining the pipe's inner wall with explosive or by surrounding an explosive with CDP formulation.

In the case of using additional explosive, CDP formulations would employ an explosive with a neutral to negative oxygen balance and the overall oxygen balance would be calculated using all ingredients expect for the carbon in the carbon dioxide ingredient.

4. Velocity of Detonation or VOD

Determining the pressure of detonation of CDP charges requires the measurement of VOD. Determining and logging VOD per test provides data that can be used to determine the effect of charge preparation and detonation technique on explosive performance and by-product composition.

A portable device, such as the HandiTrap II Continuous Explosives VOD Recorder from MREL (see www.mrel.com) can be used with a Windows based computer to measure and record this information. A probe is inserted into the pipe of a CDP charge prior to filling and the probe is consumed in the detonation.

5. By-Product Analysis for Diamond

One embodiment of the present invention requires a detonation well to collect by-product and access to an analytical lab for sample analysis. With this approach, CDP charges, generally indicated at 1, in a detonation vessel will be subtended in the centre of a cylindrical well 2 filled with water 3 and then detonated, as illustrated in FIG. 1. By-products 4 will sink to the bottom of the well where they will be collected by flushing and filtering some of the water. A flocculant, such as a water-soluble anionic polymer, may be employed to assist with precipitation of by-product. Samples can be analysed by using a laser reflection technique, a service that can be provided through any institution with the necessary equipment, such as Queen's University.

6. CDP Charge Preparation—Under High Pressure

One embodiment of the present invention in the area of charge preparation is to mix ingredients under high pressure. The suggested prototype illustrated in FIG. 2 can be used both for mixing and setting density.

Charges will be prepared by adding solid ingredients to a dry ice cooled high pressure mixer 5, capping it, pumping high pressure liquid $CO_2$ into the vessel 6, and then stirring the contents with a magnetic stirrer 7. Once the material has been adequately mixed, a valve 8 will be opened to reduce the pressure in the mixer to atmospheric, which will cause the slurry to solidify and suspend the ingredients homogeneously.

Once the mix has completely solidified, the lid 9 can be opened safely and the charge 1 removed as one solid piece. Inserting a cardboard tube prior to mixing will assist in the easy removal of a freshly prepared charge which can then be detonated as-is or inserted into a metal pipe (detonation vessel) of the desired confinement. Controlling the rate of depressurizing may be used to set final charge density.

Figure 3:
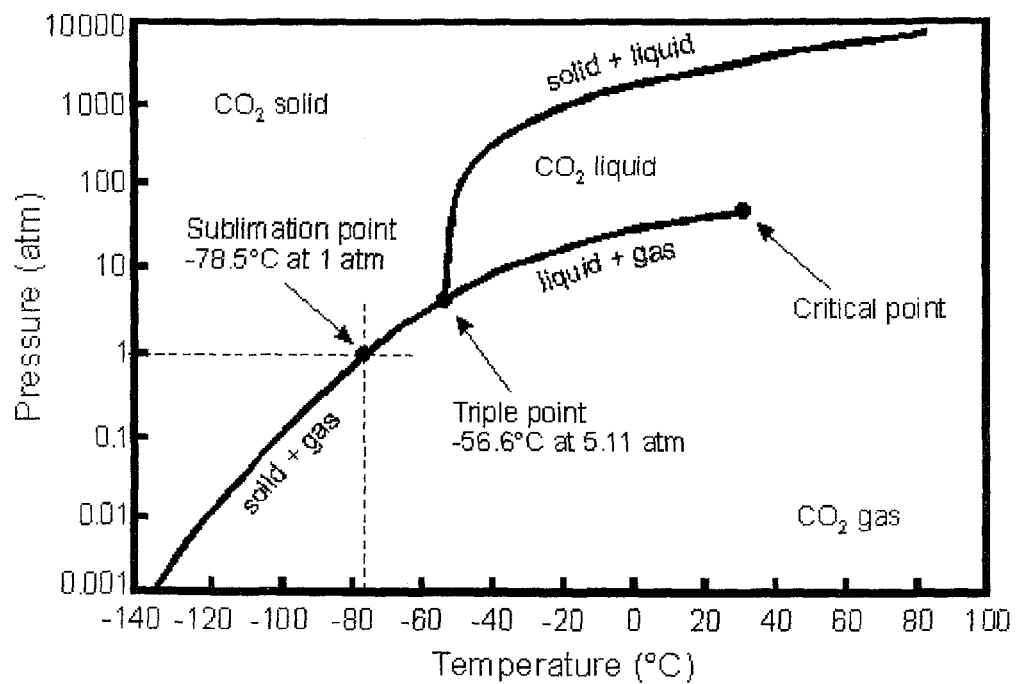
FIG. 3 is a phase diagram illustrating the combinations of temperature and pressure for various states of carbon dioxide (solid, liquid and gas)

The objective of the mixer is to create an environment where $CO_2$ is in its liquid state so that ingredients can be blended successfully. The temperature phase diagram seen in FIG. 3 assists in determining the combinations of temperature and pressure that liquefy $CO_2$.

Figure 4:
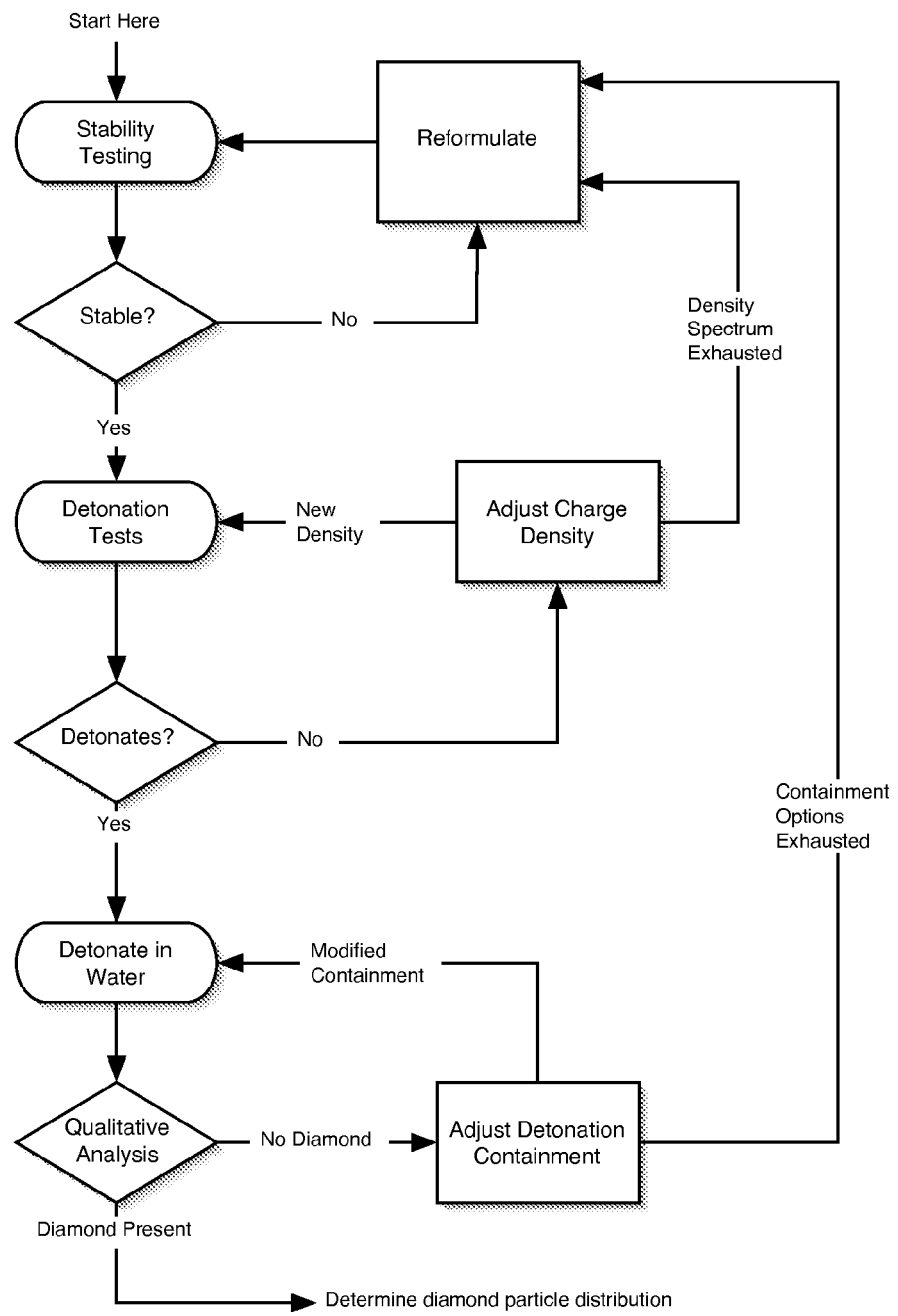
FIG. 4 is a flowchart illustrating the stability and detonation testing of the present invention.
Figure 5:
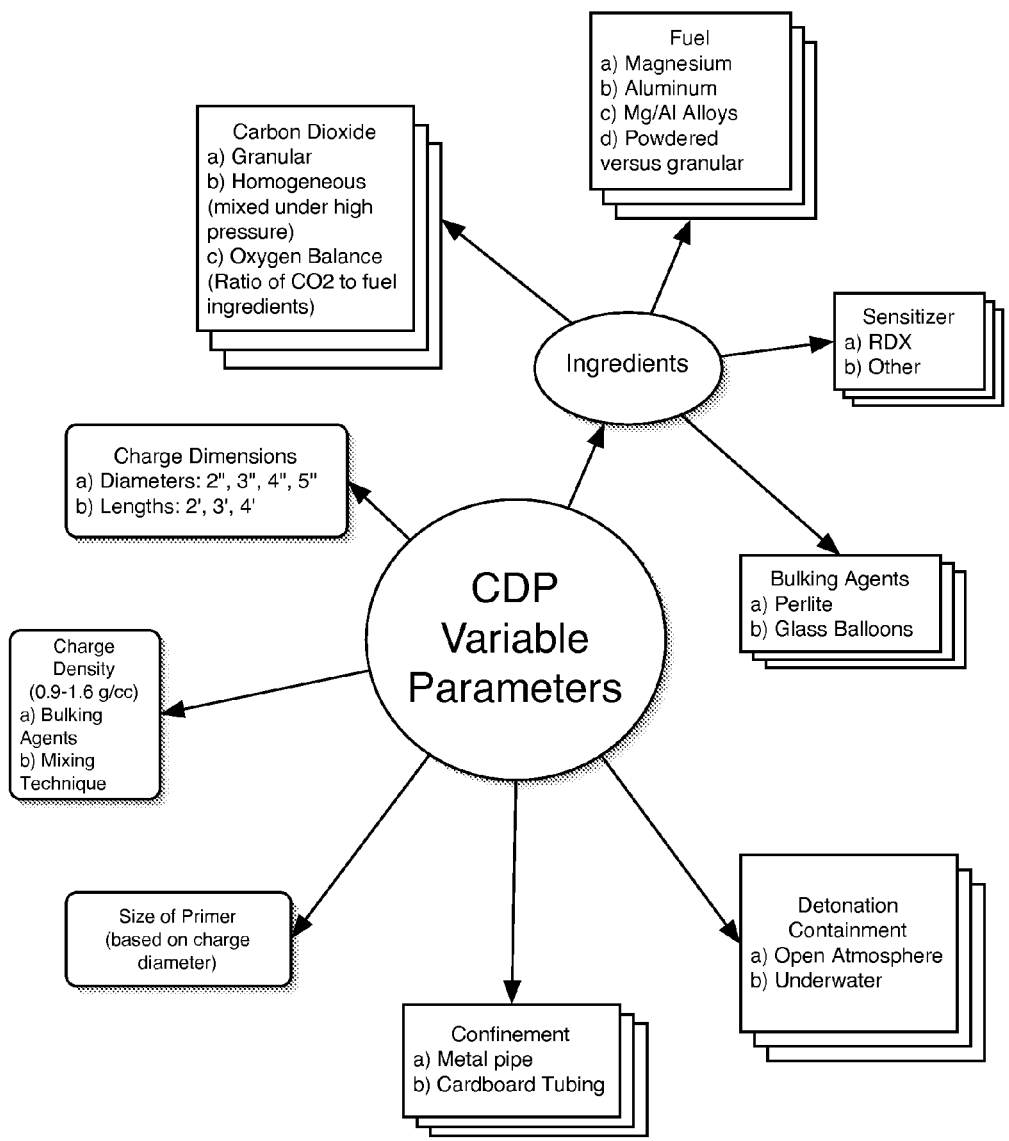
FIG. 5 is a diagram illustrating variable parameters available in the present invention.

Testing CDP formulations is an iterative process illustrated in FIGS. 4 and 5. The use of a sensitizer, such as RDX, will be explored at a stage only where tests reveal that reaction rate needs to be increased. Based on the solvent-like nature of liquid $CO_2$, RDX and other organic sensitizers would display varying degrees of solubility. The solubility of organic sensitizers can be enhanced by adding an appropriate surfactant.

CDP formulations may include agents that affect overall viscosity of liquid carbon dioxide for the purpose of assuring even distribution of solid ingredients in the mixing phase.

7. CDP—Alternative Applications

The formulation of the present invention can be used for applications other than creating industrial diamond material. As an explosive, CDP formulations would find their use in the coal mining industry as a "permissible explosive". One embodiment of a method to employ CDP formulations for permissible explosive applications would be to prepare charges for immediate use or to pump CDP formulation directly into bore holes where the material hardens and becomes ready for blasting.

Another approach with CDP formulations is in the area of propellants. When ignited with a spark or flame, CDP formulations burn very aggressively and at a high temperature. Adding excess carbon dioxide to the formulation or lining a solid core of CDP formulation with solid carbon dioxide would offer substantial thrust which could be harnessed to do work because the heat of burning the CDP formulation would vaporize any extra carbon dioxide, which would generate very high pressure.

EXAMPLES OF CDP FORMULATIONS

Example #1

Reaction and Formulation Based on Magnesium as a Fuel

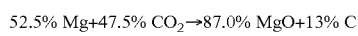

Note that CDP formulations meet or exceed the required amount of $CO_2$ to consume the fuel, which results in a neutral to positive oxygen balance.

Oxygen-Balanced Basic CDP Formulation:

| Ingredient | Weight Percent |
|---|---|
| Carbon Dioxide | 48% |
| Atomized Magnesium | 52% |

An explosive sensitizer can be added to the above in proportions ranging from 10% to 70% of the total mixture weight. A sensitizer adds the energy required to propagate the detonation process through the entire mix. Sensitizers with a zero oxygen balance are preferred as they do not affect overall oxygen balance.

The amount of sensitizer required depends on the composition of and particle size of the fuel source. For example, in the case of using magnesium as a fuel in the formulation of the present invention, more coarsely ground magnesium places a higher energy demand on the reaction, which needs to be offset by the energy made available by the sensitizer.

Example #2

Reaction and Formulation Based on Aluminum as a Fuel

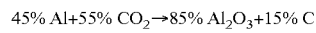

Note that CDP formulations meet or exceed the required amount of $CO_2$ to consume the fuel, which results in a neutral to positive oxygen balance.

Oxygen-Balanced Basic CDP Formulation:

| Ingredient | Weight Percent |
|---|---|
| Carbon Dioxide | 55% |
| Atomized Aluminum | 45% |

CDP Testing

All charges are to be tested with the following approach:
a) 4" by 2.5 foot EH pipe; formulation unsensitized
b) Test at mix density (~1.5 g/cc) and at the following densities: 1.25 g/cc, and 1.0 g/cc
c) based on VOD measurements, test the most energetically responsive densities with varying levels of RDX if required, starting at 10% and increasing in increments of 5%.
d) determine VOD as a function of percentage sensitizer
e) determine carbon phases and size distribution as a function of percentage sensitizer Samples will be prepared, detonated, and their VODs measured. The first tests will be conducted with 4" EH pipe×2.5", which has an internal diameter of 3.3". Initial results will reveal explosive performance across a spectrum of CDP formulations that do not include sensitizer. VOD results will offer ongoing guidance as tests are completed and indicate how to best proceed.

Charge density will be manipulated by controlling the rate of solidification and rate of mixing. If tests reveal that greater density control is required, then an appropriate bulking agent like perlite will be added to the formulation to reduce density. One disadvantage of adding a bulking agent is the proportionate decrease in energy per gram of formulation, which could subsequently lower VOD and detonation pressure.

If testing initial formulations indicate a need to increase rate of reaction, tests can be repeated with alternative reducing agents, larger diameter pipe, and with higher percentages of RDX or a different sensitizer altogether. The explosive RDX offers a desirable level of energy per gram and becomes more sensitive at lower temperatures, which makes it an appealing sensitizer candidate (wikipedia—RDX, Properties). Due to the organic solvent-like nature of liquid $CO_2$, carbon based sensitizers such as RDX should be easily soluble especially with the assistance of a surfactant. Complete solubility of sensitizer enhances overall sensitivity of CDP charges because of greater contact between ingredients.

Numerous modifications, variations, and adaptations may be made to the particular embodiments of the invention described above without departing from the scope of the invention, which is defined in the claims.

The embodiments of the invention in which an exclusive property or privilege is claimed are defined as follows:

1. A method for transforming carbon dioxide into diamonds via detonation comprising: a) preparing a detonatable charge comprising carbon dioxide ($CO_2$) in either the solid or liquid state or a combination thereof and an effective amount of a reducing agent selected from the group consisting of powdered metal, atomized metal, powder metal alloy, atomized metal alloy or metal combination thereof capable of being oxidized by the $CO_2$ so as to form elemental carbon as a byproduct wherein the charge has a neutral or positive oxygen balance calculated without including the carbon in the carbon dioxide; b) detonating the charge in an environment that protects the carbon byproduct from subsequent chemical decomposition, thereby oxidizing the reducing agent and producing a material that contains diamond; and c) harvesting diamond from the material produced by the detonation.

2. The method of claim 1 wherein the reducing agent is elemental magnesium (Mg).

3. The method of claim 1 wherein the reducing agent is elemental aluminum (Al).

4. The method of claim 1 wherein the charge is prepared by blending dry ice with the reducing agent at temperatures and pressures that permit the solid state of $CO_2$.

5. The method of claim 1 wherein the charge is prepared by combining the reducing agent with liquid $CO_2$.

6. The method of claim 1 wherein the detonatable charge also contains a sensitizer.

7. The method of claim 6 wherein the sensitizer is explosive RDX (cyclotrimethylenetrinitramine).

8. The method of claim 1 wherein the charge is detonated in one of or a combination of the following: argon, water and oxygen free water.

9. The method of claim 1 wherein the charge is detonated in water, and a water-soluble flocculant is added to the water to help precipitate the diamond-containing material.

10. The method of claim 1 wherein the charge is detonated in a heavy gauge cylinder.

* * * * *